Nov. 22, 1949     G. L. VEENSTRA     2,489,113
MAGNETIC ALARM SWITCH
Filed May 21, 1947     2 Sheets-Sheet 1
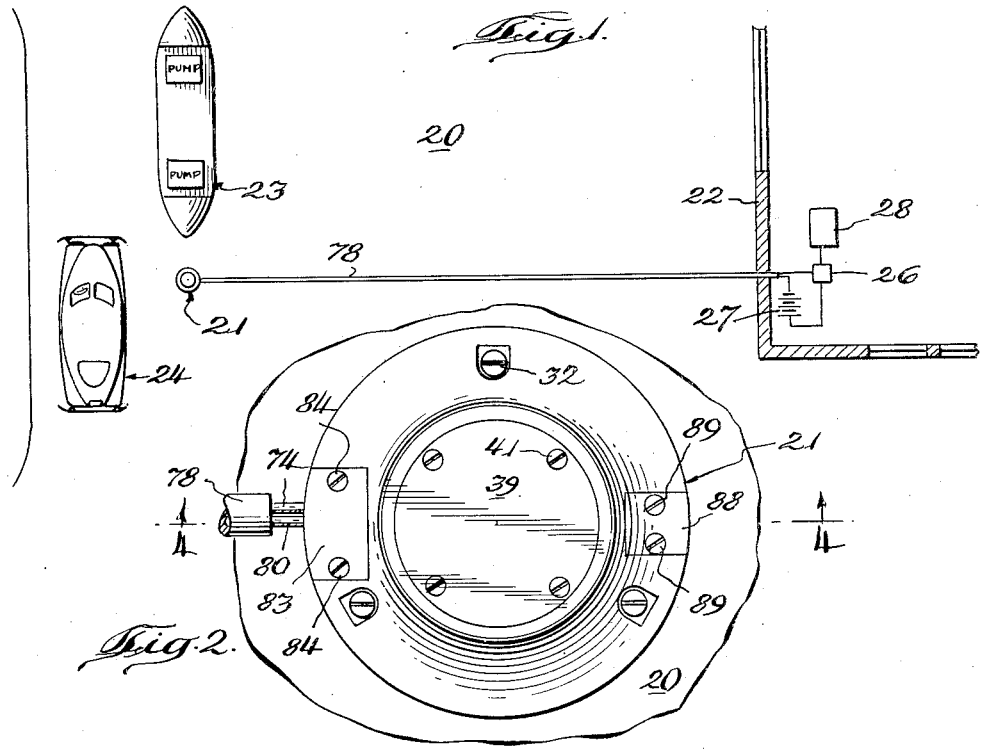
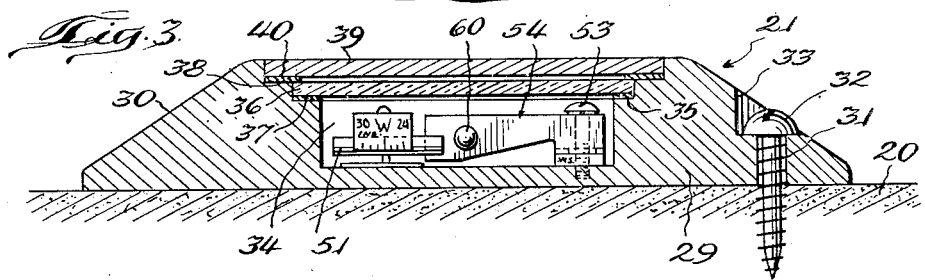
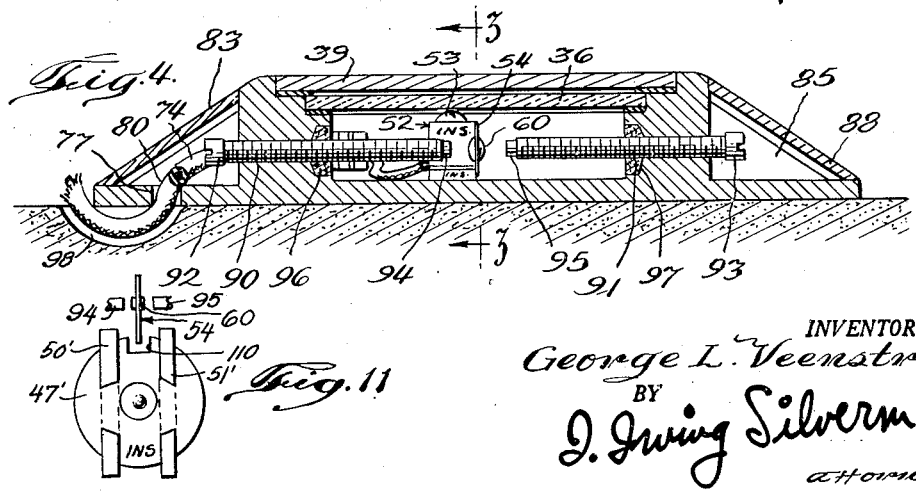
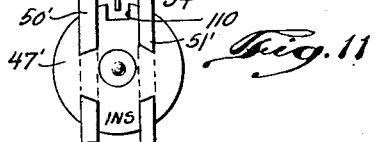
INVENTOR.
George L. Veenstra
BY
J. Irving Silverman
attorney

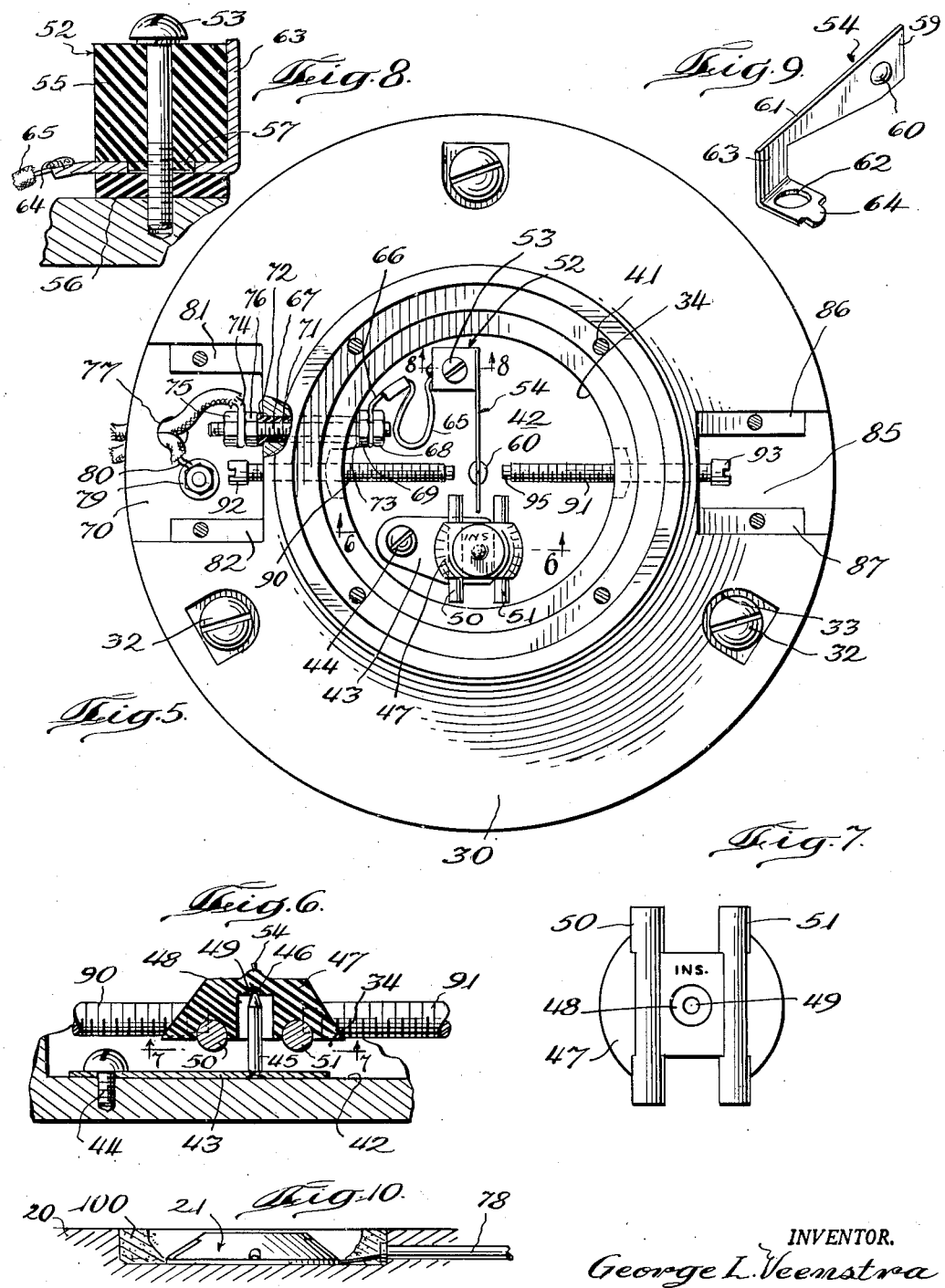

Patented Nov. 22, 1949

2,489,113

UNITED STATES PATENT OFFICE 2,489,113

MAGNETIC ALARM SWITCH

George L. Veenstra, Oak Park, Ill.

Application May 21, 1947, Serial No. 749,459

4 Claims. (Cl. 200—87)

This invention relates to alarm devices and more particularly to magnetic devices adapted to close an electrical circuit when a body of iron approaches.

My new device is especially suitable for use in connection with gasoline service stations whereby the attendant is apprised of the approach of an automobile so that he may come to the pumps and service the automobile.

There have been many types of devices whose purpose was the same as that of my new device, but the manners of operation of these prior devices have been such that many disadvantages have been inherent therein. Two general types of devices have been the mechanical contact type and the pneumatic type. In the case of the mechanical type, the weight of the automobile was used to mechanically move two electrical contacts together thereby completing an alarm circuit. The pneumatic type operated by having the weight of the automobile depress a tube and thereby cause the air pressure therein to increase, operating a diaphragm mechanically connected with the contact closing device of the electrical system.

In both of these types of devices it has been required that there be a portion of the system adapted to be run over by the automobile. Thus all approaches to the service station had to be provided with members which were required to be of such size that they were certain to be engaged when the automobile or other vehicle entered the service station driveways. In the case of the mechanical devices wear and tear was a considerable problem, and in the case of the pneumatic system, maintaining air tight connections was a problem. The pneumatic systems are sensitive and will cause an alarm when a person steps on same, and thus cause much confusion.

My new device is not intended to be engaged. It is only necessary for a large mass of iron, such as an automobile or the like to pass within a certain pre-determined distance of the device in order that an alarm be given. No apparatus other than a single member of comparatively small size is installed at key positions, the electrical connections thereto being hidden if desired, since they are not intended to be run over by the automobiles. No pneumatic or mechanical systems are used, nor is there any wear on any of the parts of my device.

My device operates on old and well-known principles, but the application thereof in the instant case is novel. A magnetic member is oriented in the earth's field at any given position of the service station and is adjusted so that when there are no automobiles in the vicinity of the same it will remain in a given position. In the event that an automobile approaches, the earth's field will be disturbed and the magnetic member will swing in one direction or another, and in so doing cause engagement between a pair of electrical contacts. This engagement may control an alarm or indicating circuit if desired.

It is accordingly the primary object of my invention to provide a device for warning of the approach of a large mass of iron, comprising a device normally quiescent when the earth's field in its immediate vicinity is normal, but serving to cause an alarm to operate if the earth's field thereabout is disturbed.

A further object of the invention is to provide a device of the character described in which the same is not intended to be engaged or run over by automobiles while warning of their approach.

Still further objects of the invention are to eliminate the disadvantages above referred to in connection with other devices and provide the advantages stated in connection with my magnetic device.

Other objects of the invention are to provide a device of the character described which can be used on any type terrain, which is weather-proof, sturdy, durable, and compact.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of my invention, I have illustrated in the accompanying drawings a preferred embodiment thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings:

Fig. 1 is a diagrammatic view illustrating the manner of installing my new device.

Fig. 2 is a top plan view of my device showing its appearance when installed on the top of the ground.

Fig. 3 is a sectional view through the same taken along the line 3—3 of Fig. 4 and in the indicated direction.

Fig. 4 is a sectional view taken along the line 4—4 of Fig. 2 and in the indicated direction.

Fig. 5 is a top plan view of my device with the cover plate and the adjustment plates removed.

Fig. 6 is a sectional view taken through the magnetic portion of my device along the line 6—6 of Fig. 5 and in the indicated direction.

Fig. 7 is a bottom plan view of the magnetic element of my device.

Fig. 8 is a sectional view of one of the portions of my device taken along the line 8—8 of Fig. 5 and in the indicated direction.

Fig. 9 is a perspective view of the sensitive contact of my device.

Fig. 10 is a sectional view on a considerably reduced scale taken through one of my devices showing the manner of installing same below the surface of the driveway.

Fig. 11 is a top plan view of a modified form of the movable magnetic element of my device.

The reference character 20 designates generally the driveway of a gasoline service station having one or more of my new devices, designated generally 21, installed thereat. The station building is designated 22 and the pump island 23. As shown in Fig. 1, the approach of an automobile 24 causes the device 21 to close the circuit in which same is connected. The leads from the device 21 pass through a conduit 78 which may be above or below the driveway 20, and into the building 22. A typical installation will include a relay 26, in series with a battery 27 and the device 21 so that the contacts of the relay 26 may operate a higher power alarm or indicating circuit designated 28 in the drawing.

The device 21 is shown in the drawings as a disc member 29 having a beveled edge as shown at 30. The disc is formed of some non-magnetic material such as brass or the like and is provided about its periphery with passages 31 extending through the same whereby the device 21 may be fastened down as for example by the screws 32. The heads of the screws 32 are adapted to be seated in recesses 33 provided therefore in the beveled edge 30. The purpose of the beveled edge 30 is to permit vehicles easily to ride upon and over the device 21 in case same is installed on the surface of the ground in the path of travel of said vehicles.

On the interior of the disc 29 and concentrically therewith is formed a cylindrical cavity 34 which carries the operating portion of my alarm device. The upper edge of the cavity 34 is provided with a set-back shoulder 35 for seating a cover glass 36 and a gasket 37. The gasket 37 besides serving as a cushion for the cover glass 36 serves to render the chamber or cavity 34 waterproof. A second set-back portion or shoulder 38 is provided above shoulder 37, the shoulder 38 being intended to carry the metal cover plate 39 and its gasket 40. The gasket 40 aids in rendering the cavity 34 waterproof in cooperation with gasket 37, both of said gaskets being formed of any suitable soft resilient material such as for example rubber. Either of the gaskets may be eliminated, if desired, in the interests of economy.

The cover plate 39 is intended to be held in position by means of a plurality of screws 41 which pass through the plate 39 and engage in appropriate screw threaded holes provided in the shoulder 38. The screw heads of screws 41 are preferably flat and countersunk into the plate member 39 so as to present a smooth surface on the top of the device 21. The cover plate and all screws and metal fittings of the device, as thus far described are made out of the same non-magnetic material from which the disc member 29 is formed.

Mounted upon the bottom wall 42 of the cavity 34 is a plate member 43 attached by means of the screw 44. Said plate member carries a pin 45 having a needle bearing point 46 which carries balanced thereupon a non-metallic, freely rotatable generally cylindrical member 47. Said member 47 is provided with a central cavity 48 having a depression 49 at the inner end thereof in order to cooperate with the needle point 46. It will be noted that the center of gravity of the member 47 is considerably below the point of engagement of the recess 49 and the point 46 in order that the member 47 will readily balance and rotate upon said point. The member 47 carries upon the bottom surface thereof a pair of bar magnets 50 and 51 on opposite sides of the bottom surface of the member 47. Said bar magnets are formed of a highly paramagnetic alloy, such as for example the ferrous alloy known in the trade as "Alnico." The bar magnets 50 and 51 may be attached by any suitable means such as for example cement or the like, or may be forced into cavities formed therefor in the member 47. If desired, in the case the member 47 is formed from a condensate product or resin, the bar magnets may be molded thereinto during formation.

It will be seen from the above description that the mounted member 47 and magnets 50 and 51 constitute a compass and the combined field of the magnets will orient itself to a position of equilibrium with respect to the earth's magnetic field, or the field of any adjacent electromagnetic influence by swinging the member 47 about the pin point bearing 46. It should be noted that the ends of the magnets 50 and 51 protrude a substantial distance outwardly from the member 47 for a purpose presently to be described.

Diametrically opposite to the member 47 a block member 52 is mounted on the bottom wall of the cavity 34. Said block member formed of insulating material and is attached to the wall 42 by means of a screw 53 which engages a central passageway in the block and an appropriate screw-threaded opening in the disc member 29. A resilient member 54 is carried by said block member insulated from the wall of the member 29 said resilient member being oriented to extend between the bifurcation comprising the ends of the magnets 50 and 51. A preferred construction of the block member 52 is shown in the drawings. There are provided upper and lower portions 55 and 56, the upper portion having a boss 57 so that an annular space is formed between the two portions when assembled, the screw 53 being insulated from the annular space.

As will be seen in Fig. 9, the member 54 comprises a strip of metal of generally L-shaped formation having a right angle bend on the one end thereof, the opposite end 59 being free and carrying a contact point 60 which is set back from the free end 59 and engageable from both sides of the metal strip. The shank of the free end 59 of the member 54 narrows down at 61 so that the end 59 will be highly flexible and sensitive.

The bent portion is provided with an opening 62 intended to fit the boss 57 so that the member 54 can be fixed to the block. The base portion 63 which is at right angles to the bent portion and is in the same plane as the end 59 and portion 61 is arranged to engage the side of the block member 52 to prevent rotation of the member 54 with respect to said block. Obviously, loosening the screw 53 will permit the block 52 and member 54 to be rotated so that the position of the end 59 with respect to the magnets 50 and 51 may be adjusted. Likewise, if desired the entire block 52 and member 54 may be replaced.

The bent portion is provided with a lug 64 to which an electrical lead 65 is soldered. The opposing end of the lead 65 is provided with a pierced lug 66 engaging the conducting member 67 which extends into the cavity 34 and being held thereto by the nuts 68 and 69. The member 67 may be in the form of a threaded rod which extends from the recess 70 formed on the periphery of the member 29 in the beveled edge 30, through the wall of the member 29 and into the recess 34. Said member 67 is insulated from the member 29 by means of the sleeve 71 and the washers 72 and 73, said washers and sleeves being formed from insulating material, and serving as well as waterproofing means to prevent the entrance of moisture into the cavity 34. At the opposite end of the member 67, I have connected an electrical lead 74, same being held in place upon the threaded end of the rod 67 by nuts 75 and 76. The lead 74 is protectively insulated except at point of electrical contact and extends through an opening 77 provided in the bottom of the recess 70 and thence into a conduit 78 or the like to the station house as described.

The cavity 70 is provided with a binding post 79 to which is electrically connected a second lead 80 which also passes out of the cavity 70 through the opening 77 and enters the conduit 78 leading to the station house. This lead is grounded to the member 29.

The cavity 70 has a pair of shoulders 81 and 82 at the sides thereof adapted to seat thereon a cover plate 83 held in position by screws 84 passing through appropriate openings in said cover plate and screw threaded into said shoulders 81 and 82. The cover plate 83 conforms to the contours of the device 21 and the screws 84 are countersunk to present a smooth unobstructive surface.

A second cavity 85 is formed on the periphery of the member 29 opposite to the cavity 70. This cavity 85 is also provided with shoulders as shown at 86 and 87 and has a cover plate 88 held in position by screws 89. It may be smaller in size than the cavity 70.

From each of the cavities 70 and 85 there extends a screw threaded member 90 and 91 through the walls of the member 29 and into the cavity 34. The outer ends of the members 90 and 91 are slotted as shown at 92 and 93 respectively, and the inner ends of the members are formed as electrical contacts 94 and 95 respectively. The members 90 and 91 electrically engage the disc member 29 but are each provided with some means for preventing moisture entering the cavity 34. This may take the form of washers or packing as shown at 96 and 97. The contacts 94 and 95 are arranged to be juxtaposed on opposite sides of the member 54 and aligned with the contact 60 so that if the free end 59 is swung to either side it will cause engagment between the contact 60 and one of the contacts 94 or 95. The distance between the contacts 94 and 95 is adjustable by screwing or unscrewing the members 90 and 91 with a screw driver, using the slotted ends 92 and 93.

In the installation of my new device, a recess may be dug in the pavement as shown at 98 to accommodate the outgoing wires in case the device 21 is installed on top of the pavement and the conduit 78 also laid on top of the pavement, or else a cavity 100 may be formed and the entire device sunk below the surface and covered with paving material with the exception of the three cover plates 39, 83, and 88. The construction of my device makes it highly adaptable to almost any condition of pavement or ground and the exact manner of installation is immaterial insofar as the claimed invention is concerned.

My device operates in the following manner:

Initially the device 21 is installed and oriented so that the neutral position of the member 54 is precisely between the magnets 50 and 51 as shown in Fig. 5. Since all of the station equipment, such as the pumps of the pump island 23, the station building 22, etc. are in place, this orientation properly compensates for magnetic deviation. In the event that a vehicle such as an automobile 24 passes near the device, the compass will swing and one or the other of the magnets 50 or 51 will engage the free end 59 of the member 54 moving the contact 60 against either the contact 94 or the contact 95. By proper adjustment of the members 90 and 91 the distance within which the vehicle must come in order to cause such engagement can be adjusted.

The form of the member 54 is an important feature of my invention. The member is made from highly resilient spring metal such as for example Phosphor bronze so that it will readily return after being deformed. The large end portion 59 carrying the contact 60 serves to give the member inertia so that when struck by the moving magnet it will swing in a wide arc. The narrow portion 60 increases the sensitivity of the member 54 so that very little moment is required to move the same, although the resilient quality is still present. As a result of this construction, the approach of the automobile will cause the contact 60 to only momentarily engage say the contact 94 due to the inertia of the end 59, said end then swinging back due to the resilence of the portion 61 to a non-engaging position. This causes only a short completion of the circuit as will be explained, so that the alarm will not ring continuously if an automobile approaches the device 21 and stops there. Naturally by proper adjustment of the members 90 and 91 a continuous engagement may be obtained if desired, but the above described arrangement is believed preferable.

When the contact 60 engages the contact 94 the following circuit is completed: wire 77, member 67, lug 66, lead 65, lug 64, member 54, contact 60, contact 94, member 90, disc member 29, binding post 79, and wire 80. The wires 77 and 80 are connected to some alarm or indicating circuit as described which may light a lamp or ring a bell, etc.

Once the device has been installed, adjustments to the members 90 and 91 may be made by removing the cover plates 83 and 88. The removal of the large cover plate 39 permits the interior of the recess 34 to be seen through the cover glass 36. It should be noted that adjustments can be made to the plate member 43 to re-orient the position of the pin 45, and to the block member 52 as explained above. It should also be appreciated that all of the various parts of the device can readily be removed and replaced or repaired.

If desired, the members 90 and 91 need not be grounded but may be connected to different alarm circuits whereby the location of an approaching vehicle may be determined from the alarm. It should also be apparent that the application of my device is not limited to service stations but may as well be made in any arrangement where it is desired to warn of the approach of bodies of ferrous metal.

Certain terms are used in the claims appended hereto which are intended to convey broad connotations rather than the narrow interpretations apparently assigned thereto. The term "magnet" is not intended to mean a single magnetic member but also extends to a group or plurality of magnetic members producing a resultant field. Obviously there will be a structure of a single member capable of producing said field. In the case of the word "bifurcation" it is intended that the use of any forked member or extension of the rotatable member 47 be included. In the preferred structure the magnetic members 50 and 51 form the bifurcation but this is not essential to the operation of the device.

In line with the above, there is shown in Fig. 11 a modified form of the moving member designated 47' corresponding in function to member 47. Said member 47' carries two permanent magnets 50' and 51' molded thereinto and has a bifurcation which is actually a slot cut into an edge presenting its opposite sides 110 and 111 to the free end of the resilient member 54.

It is believed that my invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claims.

What I claim and desire to secure by Letters Patent of the United States is:

1. In a device for detecting the approach of vehicles having ferrous parts in a driveway and comprising a housing having a magnet therein adapted to swing when a vehicle approaches for closing an electrical circuit, the herein described invention which consists in said magnet being mounted for rotation in a horizontal plane under the influence only of the resultant magnetic field of the earth at the locality of the device, bifurcated prodding means carried by said magnet, a resilient contact member attached to said housing and connected to said circuit and having its free end disposed between the bifurcations, the housing being oriented relative to the said resultant field normally to be poised with the said free end of the contact member clear of the bifurcations when no vehicle is in the vicinity of the device, a pair of members attached to said housing and presenting electrical contacts to opposite sides of said resilient member and being connected to said electrical circuit, the swinging of said magnet serving to move the end of said resilient member against one or the other of said contacts.

2. In a device for detecting the approach of vehicles having ferrous parts in a driveway and comprising a housing having a magnet therein adapted to swing when a vehicle approaches for closing an electrical circuit, the herein described invention which consists in said magnet being mounted for rotation in a horizontal plane under the influence only of the resultant magnetic field of the earth at the locality of the device, bifurcated prodding means carried by said magnet, a resilient contact member attached to said housing and connected to said circuit and having its free end disposed between the bifurcations, the housing being oriented relative to the said resultant field normally to be poised with the said free end of the contact member clear of the bifurcations when no vehicle is in the vicinity of the device, a pair of members attached to said housing and presenting electrical contacts to opposite sides of said resilient member and being connected to said electrical circuit, the swinging of said magnet serving to move the end of said resilient member against one or the other of said contacts, said pair of members being adjustable to move the electrical contacts on a line tangentially to the movement of the bifurcated prodding member whereby the distance which the free end of the resilient member must move prior to engaging either said electrical contacts may be varied.

3. In a device for detecting the approach of vehicles having ferrous parts in a driveway and comprising a housing installed in the driveway and having a magnet therein adapted to move when a vehicle approaches for closing an electrical circuit, the herein invention which consists of said magnet being mounted for free rotation for a limited extent in a horizontal plane and being under the influence only of the resultant magnetic field of the earth at the location of the device, an elongated resilient member having one end insulatedly mounted within the housing and fixed relative to the magnet, a pair of juxtaposed contacts on opposite sides of the resilient member and normally not engaged thereby, said electrical circuit adapted to be closed upon engagement of the resilient member with either of the contacts and opened upon cessation of said engagement, means carried by the magnet normally poised on opposite sides of the free end of the resilient member without touching the same, but adapted upon swinging of the magnet in either direction caused by the approach of a vehicle momentarily to engage one side of the said end of the said resilient member to move said resilient member to engage one of said electrical contacts.

4. In a device of the character described, comprising a housing adapted to be positioned relative to a driveway where the approach of vehicles having ferrous parts will be detected, an electrical circuit adapted to be closed by the approach of vehicles adjacent the housing, and said housing having therein a pivoted magnet; the invention herein described which comprises prodding means carried by said magnet, a resilient contact member carried by the housing and adapted to be engaged by the prodding means, electrical contacting means adapted to be engaged by the resilient contact member to close said electrical circuit, said magnet being mounted for rotation in a horizontal plane under the influence only of the resultant magnetic field of the earth at the locality of the device, said prodding means normally being free of said resilient contact member, whereby the approach of a vehicle will disturb the said resultant field and cause the swinging of the prodding means into engagement with the resilient member to move same against the electrical contacting means closing said circuit, the magnet strength and the rigidity of the resilient member being such that only momentary contact will be made upon said approach, whereby the approach of additional vehicles will result in additional momentary closings of the circuit, said prodding means including a pair of juxtaposed engagement portions, said free end of said resilient member being disposed between said portions.

GEORGE L. VEENSTRA.

REFERENCES CITED

The following references are of record in the file of this patent:

UNITED STATES PATENTS

| Number | Name | Date |
|---|---|---|
| 461,178 | Beckers | Oct. 13, 1891 |
| 894,237 | Stivers | July 28, 1908 |
| 1,951,409 | Havenner et al. | Mar. 20, 1934 |
| 1,975,762 | Behmer | Oct. 9, 1934 |
| 2,019,855 | Hewitt et al. | Nov. 5, 1935 |
| 2,036,277 | Johnson | Apr. 7, 1936 |
| 2,223,573 | Nulsen | Dec. 3, 1940 |
| 2,240,891 | Marchant | May 6, 1941 |
| 2,255,187 | Reasoner | Sept. 9, 1941 |
| 2,261,631 | Rosenthal | Nov. 4, 1941 |
| 2,314,465 | Shaw | Mar. 23, 1943 |
| 2,360,885 | Metcalf | Oct. 24, 1944 |
| 2,397,137 | Glennon et al. | Mar. 26, 1946 |